July 28, 1925.
J. T. ROSS
1,547,827
MECHANICAL MOTOR
Filed July 16, 1924   3 Sheets-Sheet 3
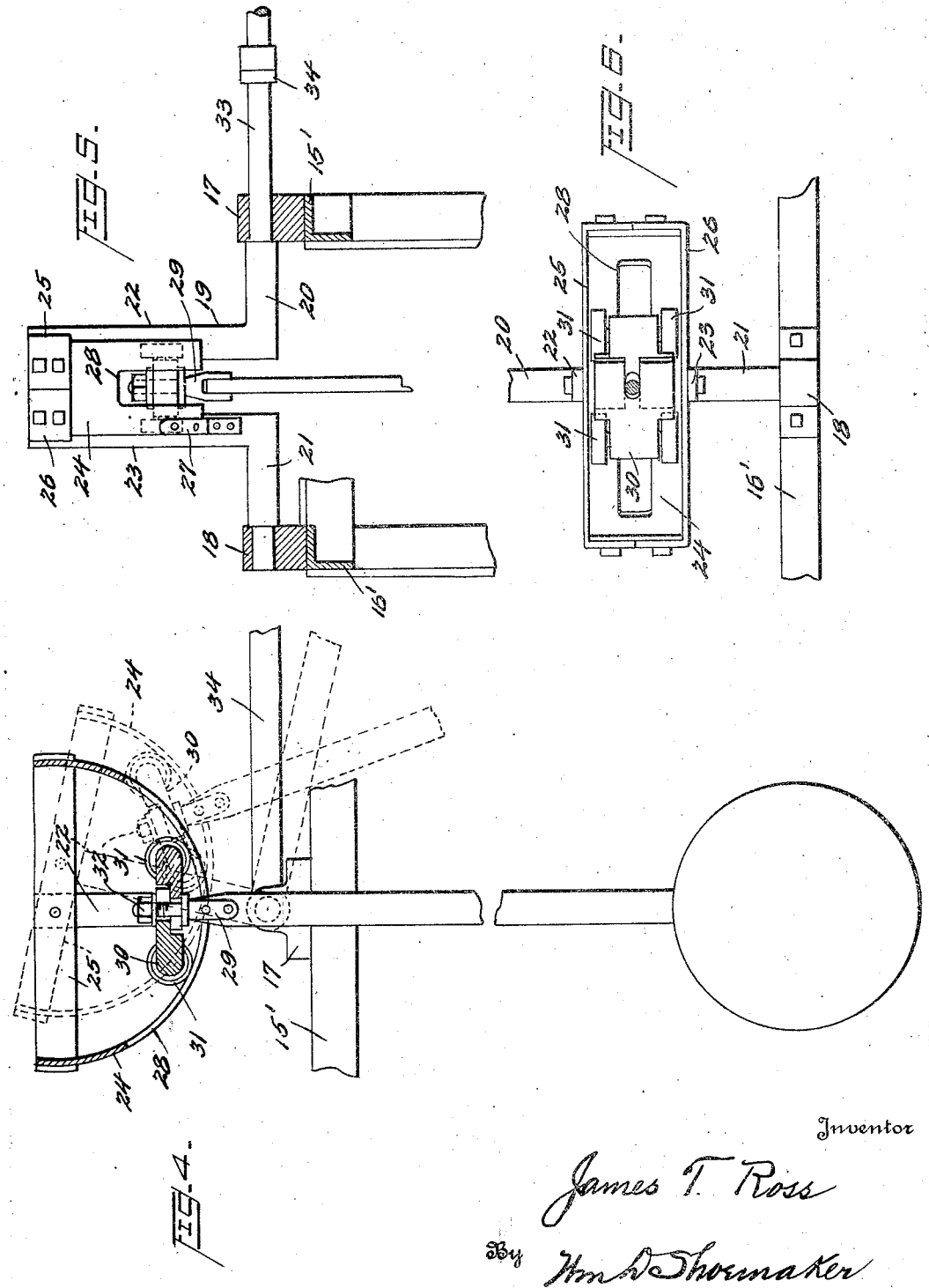
Inventor
James T. Ross
By Wm D Shoemaker
Attorney Patented July 28, 1925.

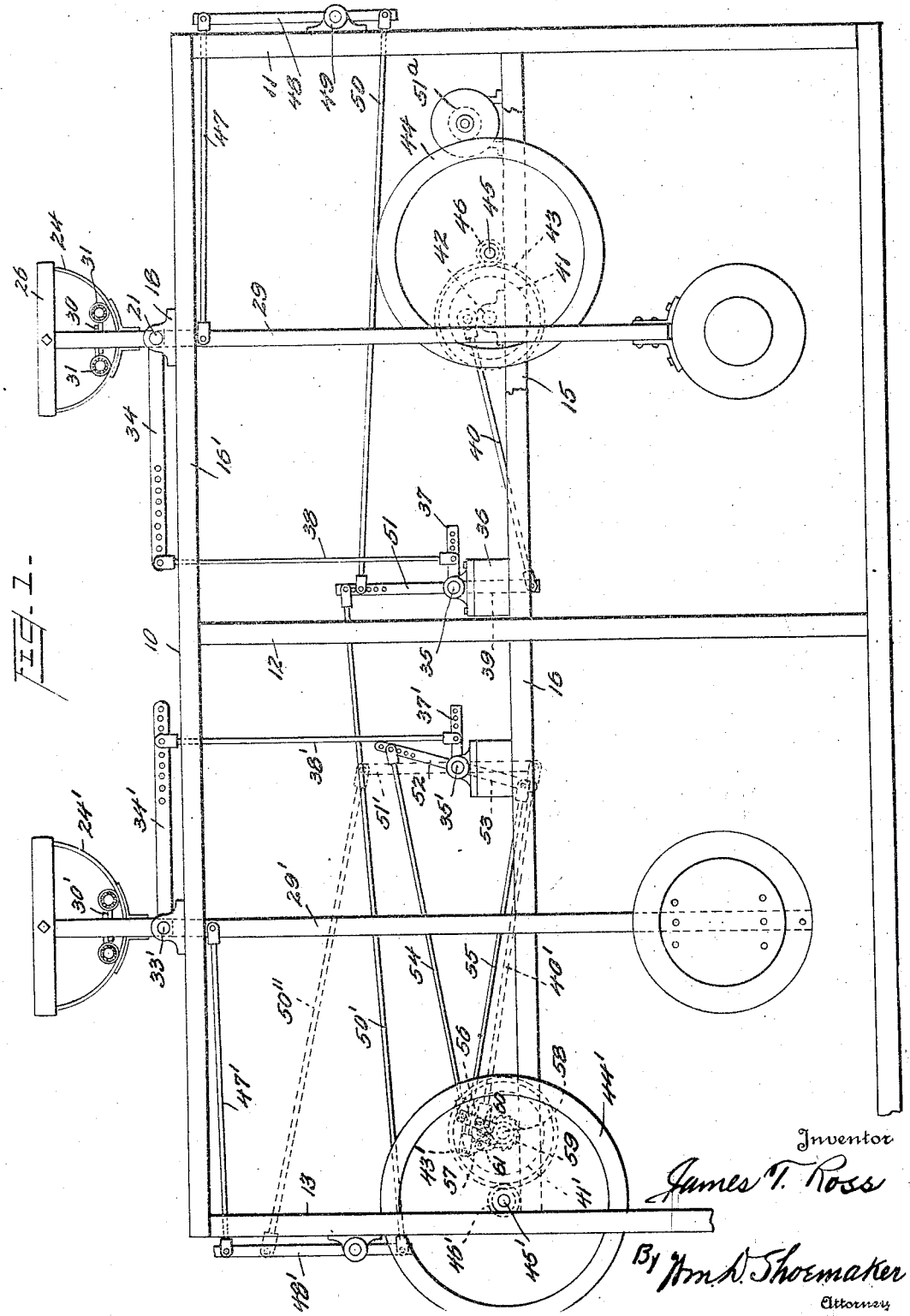

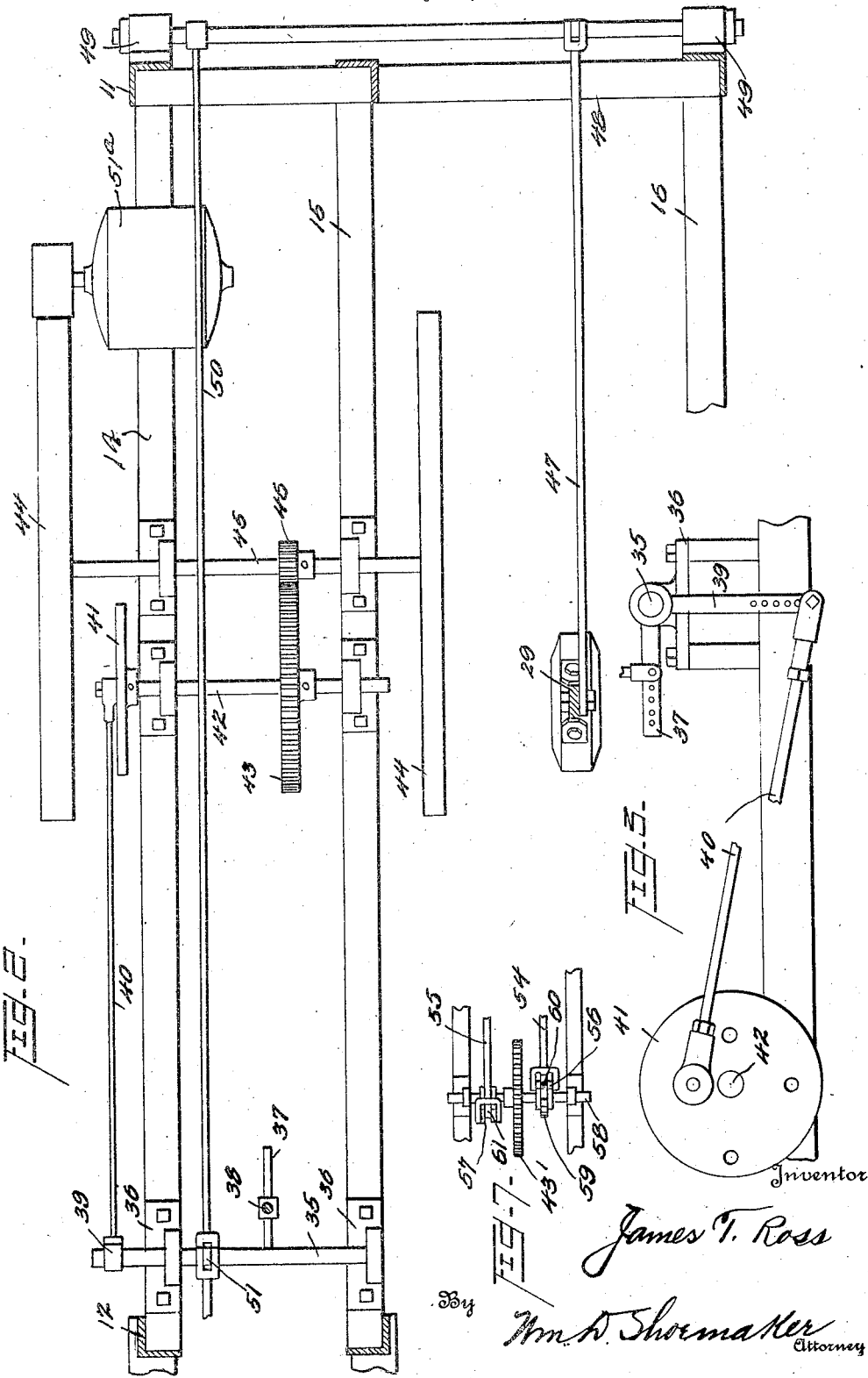

1,547,827

UNITED STATES PATENT OFFICE.

JAMES T. ROSS, OF FORT WORTH, TEXAS, ASSIGNOR OF ONE-HALF TO JOHN R. FUNK, OF DUNCAN, OKLAHOMA, AND ONE-FOURTH TO H. T. MAXEY, OF ENID, OKLAHOMA.

MECHANICAL MOTOR.

Application filed July 16, 1924. Serial No. 726,299.

*To all whom it may concern:*

Be it known that I, JAMES T. Ross, a citizen of the United States, residing at Fort Worth, in the county of Tarrant and State of Texas, have invented certain new and useful Improvements in Mechanical Motors, of which the following is a specification.

This invention relates to a mechanical motor and more particularly to such a motor comprising a plurality of energy storing elements connected to move in synchronism. The object of the invention is to produce a mechanism by which constant energy of a small high speed motor can be translated into an intermittent application of power through a relatively short distance without the production of shocks or jars in the mechanism or injury to the motor. Another object of the invention is the production of a power transmission mechanism comprising a plurality of energy storing elements connected to move in synchronism. A further object of the invention is the production of a unit comprising a plurality of energy storing elements connected in synchronism to which power may be applied at any point and from which power may be taken at another point. A further object of the invention is to provide connecting means for two or more such units whereby the movement of all of the parts may be made steadier. A still further object of the invention is the production of a mechanical movement comprising a pendulum minus a fixed pivot cooperating with an oscillating track-way, whereby movement of the pendulum will cause a rocking of a shaft associated with the track-way.

Other objects and advantages of the invention will hereinafter appear in the following description and the novel features thereof will be particularly pointed out in the appended claims.

Like reference numerals indicate like parts throughout the several figures of the drawings, in which—

Figure 1 is a side elevation of a mechanism embodying my invention,

Figure 2 is a horizontal section through a portion thereof showing a slight modification.

Figure 3 is an enlarged elevation of a portion of the train of elements included in the motor, Figure 4 is a side elevation of the oscillating weight time mover, Figure 5 is an elevation of the mounting for the prime mover taken at a right angle to the view of Figure 4, Figure 6 is a plan of the mounting shown in Figure 5, and Figure 7 is a detail of a double pawl drive for taking power off of the second unit.

For the purposes of description the mechanical motor of my invention may be subdivided into parts as follows:

An oscillating weight or pendulum having a specially designed mounting, imparts a rocking motion to a shaft; the oscillating weight is acted upon by a small motor to maintain its oscillations. The oscillating weight is connected to a fly wheel through a double connection, one part of which comprises a pitman, whereby the fly wheel and a weight mutually maintain motion in the motor. Power is applied to the motor at any suitable point; it is shown as applied to the fly wheel. Two units are shown connected together, the second unit having one of its pawl connectors operable in one direction only.

The several parts just enumerated will now be described in detail and their individual functions pointed out after which a recital of their conjoint use will be given.

The motor is mounted in a frame work 10 of angle iron. The particular construction of the frame work is not important; any type of frame which will support the several elements of the motor in proper relationship will answer the purposes quite as well as the frame work shown. The oscillating weights may be mounted swinging below the floor, in which case the frame work need not be as high as that shown.

The frame work shown consists of three pairs of uprights 11, 12, 13, connected by longitudinal cross rails 14, 15, 16, at substantially one-half the height of the frame, and by similar rails at the top of the frame indicated by the numerals $15^1$, $16^1$. At each end and intermediate the frame shown in Figure 1, suitable rails connecting the longitudinal rails and the uprights are provided at substantially one-half the height of the frame and at the top and bottom of the frame.

Upon the rails $15^1$, $16^1$, bearings 17 and 18 are secured, in which is mounted a rocking weight support 19 having the general form of an open crank in end elevation. The support comprises rock shaft sections 20 and 21, and standards 22 and 23. Between the standards a curved track 24 is secured in any suitable manner; as shown, however, arms 25 and 26 are bolted to the upper ends of the standards and at the ends of the arms, legs are provided to which are bolted the ends of the track. The central portion of the track is secured to the standards by means of the brackets 27. There is provided a longitudinal slot 28 in the track through which projects the stem 29 of the weighted element.

The stem 29 at its upper end is attached to a truck 30, which has four rollers 31 at its corners, and it will be seen that this truck is adapted to travel upon the curved track in the movement of the weighted element. The truck is formed by two sections adjustable with relation to each other, and the parts are secured together by clamping them with a nut 32 on a screw threaded projection upon the stem 29.

From the showing of Figure 4 it will be seen that the weighted element is swung from its central full line position to a position shown in dotted lines in said figure. During this swinging movement, the truck will ride up the descending side of the track, and thereby apply the weight of the pendulum to the descending track side, resulting in a rocking movement of the shaft sections 20 and 21. The weighted element will then swing back across its full line position to a position on the opposite side of the center, which will be in all respects similar to that shown in dotted lines on the figure. Upon each such swing of the weighted element, the curved track will be rocked and the motion thereof imparted to the shaft sections. While it is designed that the track shall oscillate in synchronism with the oscillations of the weighted element, it will be obvious that free movement between the track and prime mover will be permitted; connections hereinafter described are provided for maintaining the movements of these elements in synchronism.

The shaft section 22 is extended at 33 to form a rock shaft from which an arm 34 projects and counter shaft 35 is mounted upon a stand 36 secured to the frame work. From the shaft 36 there projects an arm 37. The motion of the rock shaft 33 will be imparted to the counter shaft 35 through a connector 38 adjustably secured to both the arm 34 and arm 37, the extent of movement being controlled by the adjustment of the connector with respect to the arms.

Depending from the counter shaft 35 is a second arm 39 apertured for adjustable connection to the pitman 40, which pitman is adjustably secured to a solid wheel 41 mounted upon a shaft 42 which also carries the large gear 43. 44 indicates a fly wheel supported by the frame of the machine and mounted upon the same shaft 45 with the small gear 46. It will be appreciated that the fly wheel 44 when in motion will drive the large gear 43 through the small gear 46, which large gear in turn will oscillate the counter shaft 35 through the solid wheel 41, pitman 40, and arm 39. The motion of the fly wheel is further transmitted to the rock shaft 33 through the arm 37, connector 38, and arm 34.

In order that the oscillation of the track will be synchronized with the oscillation of the weighted element, provision is made for connecting both to the counter shaft 35. The connections between the track and the counter shaft 35 have been described in the preceding paragraphs. To connect the pendulum with the shaft 35, the connecting rod 47 extends from the pendulum to a lever 48 mounted in a bearing 49 upon the frame; the opposite end of said lever is connected by means of a rod 50 with a third arm 51 projecting from the counter shaft 35. This third arm is apertured for adjustable connection with the rod end. It will be appreciated that the proportions of the parts are so chosen to permit of a free and easy movement thereof. The length of the stem of the pendulum is selected with due regard to the curvature of track, the amount of rocking in the shaft 33, and the length of the several arms upon the counter shaft 35.

Likewise the fly wheel with its train of reducing gear have been selected to correspond with the swing of the pendulum. It will be noted from Figure 1 that when the pendulum is at its central position, the pitman is in a position to exert a maximum of push or pull upon the solid wheel 41, and that when the pendulum is at its limit of displacement, the pitman will be at a dead center. It will also be appreciated that the fly wheel will have its influence upon both the oscillating track and the weighted element. In order to apply power to the mechanism an electric motor 51a may be mounted upon the frame work in such position as to apply power to the fly wheel 44. This power is transmitted to the track and to the weighted element and will maintain them in synchronized motion through the connections described.

From the unit just described, power may be taken off at any point. It will be seen that a small force acting through the connecting rod 47 upon the weighted element will be sufficient to keep it in motion and will produce at the end of the arm 34 a comparatively large force which may be used for the operation of any suitable mechanism.

Referring again to Figure 1, it will be observed that the unit just described is that shown to the right. The unit to the left may be a substantial duplicate of that just described. There is shown, however, a slightly modified construction which is intended to illustrate the possibility of the motor by showing that the fly wheel of this second unit is receiving energy at all times and does not impart it to the other elements of the motor.

This second unit comprises a weighted arm $29^1$ mounted upon a track-way $24^1$, the elements of which are substantial duplicates of those described in connection with the first unit. It will be appreciated that the truck $30^1$ supporting the stem $29^1$ will cooperate with the curved track $24^1$ in a manner to produce a rocking of the shaft $33^1$ and that the movement of the arm $34^1$ will be imparted to the counter shaft $35^1$ through the rod $38^1$ and arm $37^1$. It will also be appreciated that the movements of the weighted element $29^1$ are maintained in synchronism with the elements of the first unit described by means of the connecting rod $47^1$, lever $48^1$, and rod $50^1$, which last named rod connects the short end of the lever $48^1$ with the arm 51 from the counter shaft 35. The track-way $24^1$ oscillates under the influence of the weighted element $29^1$ and is limited in its movement by the swing of the arm $37^1$ connected therewith as hereinbefore described. Arms 52 and 53 project at diametrically opposite points from the counter shaft $35^1$ and, acting through rods 54 and 55, advance pawl carriers 56 and 57 mounted to oscillate freely upon the shaft 58. On the shaft 58 is mounted the ratchet wheel 59 with which the pawls 60 and 61 engage to advance the ratchet wheel and the shaft.

The fly wheel $44^1$ is mounted upon a shaft $45^1$, which shaft also carries a small gear $46^1$ meshing with the larger gear $43^1$ on the shaft 58. It will be appreciated that by the construction just described the energy is supplied to the fly wheel $44^1$ from the motor and that work of any type might be accomplished from the shaft $45^1$.

It will be appreciated that the shaft 58 carries a disk $41^1$ with which a pitman $40^1$ may be connected to obtain motion from the shaft $35^1$. These parts can be added without alteration of the second unit as shown. They are illustrated on the drawing in dotted lines. When they are employed, more accurate synchronizing will be obtained if a rod $50^{11}$ is employed to connect the lever $48^1$ with an arm $51^1$ from the shaft $35^1$.

When more than a single unit is employed, the additional unit is preferably of larger size. That is, the weight of the pendulum is increased and likewise the size and weight of the fly wheel. On the drawings, the swinging track of the second unit is shown of increased dimension over that of the first unit. It will be appreciated, however, that the effective length of the two weighted elements must be the same.

From the foregoing detailed description the operation of the several parts should be clear. It remains to a complete understanding of the invention to recite the conjoint use and the method of starting the motor in operation.

Before starting, the rods 50 and $50^1$ are disconnected at one end, preferably from the arm 51. The fly wheel 44 is then set in motion manually or by a suitable means, it being understood that the motor $51^a$ is generally not of sufficient power to start the fly wheel. The fly wheel will drive the counter shaft 35 and oscillate the track 24. The weighted element is then oscillated manually and controlled so that its oscillations will become synchronized with the oscillations of the track. When this has been accomplished, the rod 50 can be readily connected to the arm 51. When this is done, the unit to the right of Figure 1 is in motion and the small motor $51^a$ acting against the circumference of the fly wheel will maintain this motion.

The fly wheel $44^1$ is next started manually after which the weighted element $29^1$ is swung and controlled to secure synchronism with the track $24^1$. When this has been accomplished, it will be maintained automatically. The motion however of the weighted element $29^1$ is then retarded or advanced manually to produce synchronism between its oscillations and those of the pendulum 29. When this has been accomplished, the rod $50^1$ may be connected to the arm 51 and the complete motor of two units will then be in motion, properly synchronized and maintained in such condition by the motor $51^a$.

Having described my invention, what I claim as new and desire to secure by Letters Patent is:

1. In a mechanical motor, the combination with a curved track adapted to oscillate, and a pendulum supported to move upon said track during its swinging movements.

2. In a mechanical motor, the combination with a curved track adapted to oscillate on a fixed pivot, and a weighted element supported to move longitudinally on said track and to oscillate therewith.

3. In a mechanical motor, the combination with a curved track adapted to oscillate on a fixed pivot, a truck adapted to move to and fro upon the track during the oscillation thereof, and a weighted element suspended from the truck adapted to oscillate in synchronism with the track.

4. In a mechanical motor, the combination with a shaft and support therefor, an arm projecting therefrom, a curved track mounted on said shaft and adapted to oscillate to produce a rocking of the shaft, and a pendulum mounted to oscillate with said track, whereby energy from the pendulum may be imparted to the sides of said track to produce oscillation thereof.

5. In a mechanical motor, the combination with a curved track adapted to oscillate, a swinging weighted element, the track and weighted element associated to impart energy one to the other, and means for maintaining their movements in synchronism.

6. In a mechanical motor, the combination with a curved track adapted to oscillate, a swinging weighted element having a supporting truck traveling on said track and producing in its travel oscillation of the prime mover, and means for limiting the oscillatory movement of the track and for maintaining the oscillation of the track and prime mover in synchronism.

7. In a mechanical motor, the combination with a curved track adapted to oscillate, a swinging weighted element associated with the track and adapted to oscillate therewith, whereby energy from either the track or the weighted element may be imparted to the other to maintain movement in both, and means for maintaining the movements of these elements in synchronism comprising a shaft carrying arms and connections from the arms to the elements.

8. In a mechanical motor, the combination with a shaft and support therefrom, an arm projecting from said shaft, a curved track mounted above the shaft and adapted to oscillate to produce a rocking of the shaft, a truck mounted to move to and fro upon said curved track, a weighted element rigidly suspended from the truck and adapted to oscillate, a shaft mounted in the motor frame, a pair of control arms on said shaft, a connection extending from said weighted element to one of said control arms, and a connection from the other of said control arms to said first mentioned arm, whereby synchronism is maintained between the movements of said track and weighted element.

9. In a mechanical motor, a curved track adapted to oscillate upon a fixed pivot, a weighted element movably supported upon said track and adapted to oscillate therewith, a fly wheel mounted in the motor frame, and connections between these elements, whereby they mutually impart energy one to the other to maintain synchronized movement in all.

10. In a mechanical motor, a curved track adapted to oscillate upon a fixed pivot, a weighted element movably supported upon said track and adapted to oscillate therewith, a fly wheel mounted in the motor frame, connections between the track and weighted element for synchronizing the oscillations thereof, and further connections with the fly wheel whereby the energy from said fly wheel may be imparted to the track and prime mover to maintain motion therein.

11. In a mechanical motor, a curved track adapted to oscillate upon a fixed pivot, a truck adapted to move to and fro on said track, a weighted element suspended from said truck and adapted to oscillate with said track, means for maintaining synchronism between the movement of said track and weighted element comprising a countershaft, a fly wheel mounted in the motor frame and connected with said countershaft by a gear-reducing train, and means for supplying energy to the fly wheel to maintain the track, weighted element and fly wheel in motion.

12. A mechanical motor comprising connected units, each unit comprising a swinging weighted element and an oscillating curved track, the weighted element of one unit being connected to its associated track whereby the movements of these two elements are synchronized, and the weighted elements of both units being connected to oscillate in timed relationship.

13. A mechanical motor comprising connected units, each unit comprising a swinging weighted element and an associated curved track, the weighted element of one unit being connected to its associated track whereby the movements of these two elements are synchronized, the weighted elements of both units being connected with moving parts so that they oscillate in timed relationship, means for imparting energy to the motor continuously to be stored, and means for utilizing said energy in work.

14. A mechanical motor comprising connected units, each unit comprising a swinging weighted element and an associated curved track, the weighted element of one unit being connected to its associated track whereby the movements of these two elements are synchronized, said connections including a countershaft, connections between the countershaft and the weighted element of the second unit to accomplish synchronism between the movements of the two weighted elements, a fly wheel mounted in the first unit connected with the countershaft through a gear-reducing train, an electric motor acting upon said fly wheel, whereby energy is stored in the first unit for delivery to and storage in the second unit, and for utilization in work from said second unit.

In testimony whereof I affix my signature.

JAMES T. ROSS.